United States Patent
De Block et al.

(10) Patent No.: US 9,783,372 B2
(45) Date of Patent: Oct. 10, 2017

(54) FLIPPING APPARATUS, SYSTEM AND METHOD FOR PROCESSING ARTICLES

(71) Applicant: KLA-Tencor Corporation, Milpitas, CA (US)

(72) Inventors: Erik De Block, Tung Chung (HK); Carl Truyens, Rotselaar (BE)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/075,664

(22) Filed: Mar. 21, 2016

(65) Prior Publication Data

US 2016/0214802 A1 Jul. 28, 2016

Related U.S. Application Data

(63) Continuation of application No. PCT/US2016/013470, filed on Jan. 14, 2016.

(60) Provisional application No. 62/108,660, filed on Jan. 28, 2015.

(51) Int. Cl.
| | |
|---|---|
| *B65G 47/24* | (2006.01) |
| *B65G 47/90* | (2006.01) |
| *B65G 47/248* | (2006.01) |
| *B65G 47/91* | (2006.01) |
| *B65G 47/252* | (2006.01) |
| *B65G 47/244* | (2006.01) |
| *B65G 47/256* | (2006.01) |

(52) U.S. Cl.
CPC ......... *B65G 47/248* (2013.01); *B65G 47/244* (2013.01); *B65G 47/252* (2013.01); *B65G 47/914* (2013.01); *B65G 47/256* (2013.01)

(58) Field of Classification Search
CPC .............. B65G 47/244; B65G 47/2252; B65G 47/843; B65G 47/904; B65G 47/915; B65G 47/248; B65G 47/914; B65G 47/256
USPC ........................................ 198/377.04, 377.08
See application file for complete search history.

(56) References Cited

U.S. PATENT DOCUMENTS

| | | | | |
|---|---|---|---|---|
| 4,726,876 | A | * 2/1988 | Tomsovic, Jr. | ... A61F 13/15601 156/552 |
| 5,871,079 | A | * 2/1999 | Nannini | ............... B65G 47/086 198/377.04 |

(Continued)

FOREIGN PATENT DOCUMENTS

| | | |
|---|---|---|
| JP | 11-254367 A | 9/1999 |
| WO | 03-058708 A1 | 7/2003 |

*Primary Examiner* — Mark A Deuble
(74) *Attorney, Agent, or Firm* — Simpson & Simpson, PLLC

(57) ABSTRACT

A flipping apparatus, a system for processing articles comprising a said flipping apparatus, and a method for processing articles are provided. An article is picked by a first flipping arm. The first flipping arm rotates from a pick position into a pass position, at which the article is passed to a second flipping arm, which is in a receive position. The second flipping arm rotates from the receive position to a place position and places the article. By the passing of the article from the first to the second flipping arm and the rotations a flipping of the article is achieved. The first flipping arm and the second flipping arm each rotate at a higher speed when not carrying an article than when carrying an article. In addition, first and/or second flipping arm may perform a translation movement.

20 Claims, 5 Drawing Sheets

(56) References Cited

U.S. PATENT DOCUMENTS

| | | | | |
|---|---|---|---|---|
| 6,022,443 | A * | 2/2000 | Rajala | A61F 13/15764 |
| | | | | 156/302 |
| 6,083,566 | A * | 7/2000 | Whitesell | C23C 14/566 |
| | | | | 118/695 |
| 6,171,049 | B1 * | 1/2001 | Wirz | H01L 21/6838 |
| | | | | 198/339.1 |
| 6,748,293 | B1 | 6/2004 | Larsen | |
| 6,814,217 | B2 * | 11/2004 | Blumenthal | A61F 13/15764 |
| | | | | 156/520 |
| 8,636,136 | B2 * | 1/2014 | Schoultz | B65G 47/248 |
| | | | | 156/164 |
| 2002/0112939 | A1 * | 8/2002 | Sumi | A61F 13/15764 |
| | | | | 198/377.08 |
| 2007/0022714 | A1 * | 2/2007 | Flagg | B65B 43/325 |
| | | | | 53/389.1 |
| 2013/0295721 | A1 | 11/2013 | Lyu | |
| 2014/0154037 | A1 | 6/2014 | Sen | |

* cited by examiner

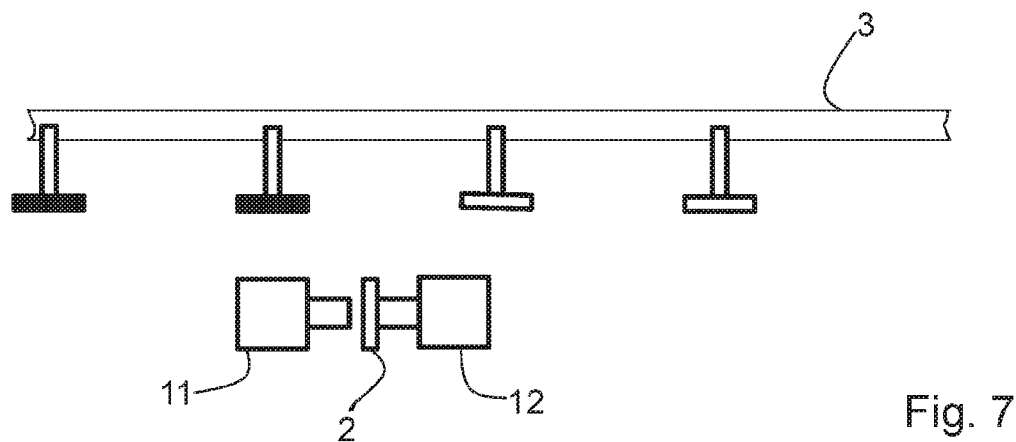
Fig. 7
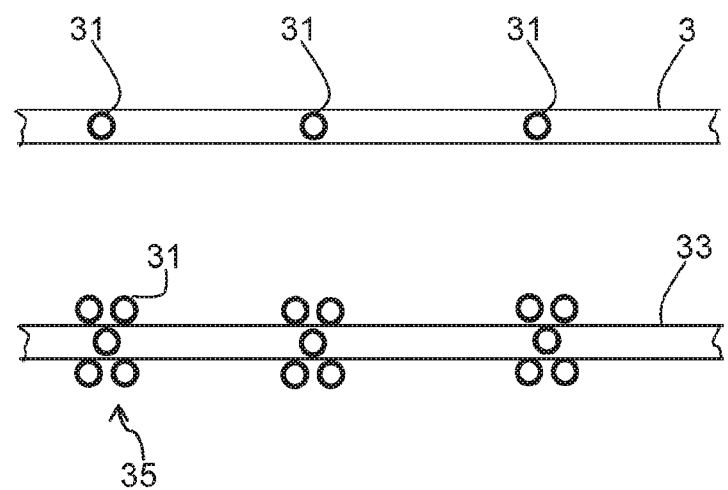
Fig. 8
| | | | | | | | |
|---|---|---|---|---|---|---|---|
| total cycle (ms) | 180 | 30 | 30 | 30 | 30 | 30 | 30 |
| rotate turret | 90 | | | | 30 | 30 | 30 |
| turret drop on 1st flipping arm | 30 | 30 | | | | | |
| turret pick on 2nd flipping arm | 30 | | | 30 | | | |
| slide 1st flipping arm | 90 | | 30 | 30 | 30 | | |
| slide 2nd flipping arm | 150 | 30 | 30 | | 30 | 30 | 30 |
| slow swing down | 60 | | | 30 | 30 | | |
| fast swing down | 30 | | | | 30 | | |
| transfer | 30 | | | | | 30 | |
| slow swing up | 60 | 30 | | | | | 30 |
| fast swing up | 30 | | | | | | 30 |
Fig. 9

FLIPPING APPARATUS, SYSTEM AND METHOD FOR PROCESSING ARTICLES

CROSS-REFERENCE TO RELATED APPLICATIONS

This application is a Continuation of International Application Serial No. PCT/US2016/13470, filed on Jan. 14, 2016, which application claims the benefit under 35 U.S.C. §119(e) and Article 4 of the Stockholm Act of the Paris Convention for the Protection of Industrial Property of U.S. Provisional Patent Application No. 62/108,660, filed Jan. 28, 2015, which applications are incorporated herein by reference in their entireties.

FIELD OF THE INVENTION

The invention relates to a flipping apparatus for flipping articles, a system for processing articles having such a flipping apparatus, and a corresponding method for processing articles. The flipping of an article is achieved by passing the article between two flipping arms which perform a rotation each.

BACKGROUND OF THE INVENTION

In systems processing articles it is often necessary to turn an article around, or to flip it, so that a side of an article facing in one direction before the flip faces into the opposite direction after the flip. For example, if an article is to be inspected, it may be necessary to inspect the entire article; one possibility to achieve this is to flip the article between consecutive inspection steps, so that different sides of the article can be inspected. Analogous statements apply if opposite sides of an article or object need to be worked on. If articles are to be processed at high throughput, flipping the articles has to be done at a high rate.

Several types of flipping systems are known. One type is a hand-over flipping system. In such a system the article or object is held by a first handler, for example a vacuum nozzle, rotated by 90 degrees, handed over to a second handler, which performs a further rotation by 90 degrees. In this way, a flip of the object or article can be achieved. In such a type of system, the input position, i.e. the position from where the article is picked by the first handler, is usually different from the output position. Furthermore, the hand-over flipping system has to complete the flipping operation for one article, before it can commence the flipping operation for a further article.

A further type of flipping system is a rotational flipping system. The article to be flipped is placed into a bottom nest, which then is covered with a top nest. This assembly is rotated by 180 degrees. The former bottom nest, now on top, is removed, and the flipped article can be removed from the former top nest. Such a system has to complete the flipping operation for one article, before it can commence the flipping operation for a further article.

Yet another type of flipping system is a spoke-wheel flipping system. The article is picked up by a handler, for example a vacuum nozzle, from an input location. The handler, carrying the article, then rotates by 180 degrees, which implies a rotation of the article by 180 degrees. The article is then picked from the handler by a further handler. With this approach, the distance between the input position, from where the article is picked up, and the output position, from where the article is picked after the rotation, is at least twice the length of the handler.

If a flipping operation for one article has to be completed before a flipping operation for a further article can be started, this is a limiting factor on the throughput of the flipping system and may adversely affect the throughput of any processing system using such a flipping system. If flipping systems are used for which the input position of an article is different from the output position of the article, the workflow in and the configuration of a processing system have to take this change of position into account. Therefore, if the articles are to be processed without flipping in some occasions, changes to the configuration of the processing system become necessary, as either the change of position of the article has to be achieved without a flip of the article, or an alternative path of the articles through the processing system has to be established.

SUMMARY OF THE INVENTION

It therefore is an object of the invention to provide a flipping apparatus for articles which is suitable for high throughput, and which can be integrated into a system and operated in such a way that articles can also be handled without a flip, without requiring major reconfigurations of the system. Furthermore, despite the need for high speed movements of articles if high throughput is desired, the operation of the flipping apparatus shall be such that the risk of damage to an article is reduced.

This object is achieved with a flipping apparatus as set forth in the claims below.

It is a further object of the invention to provide a system for processing articles, which can be operated at high throughput, and wherein the articles can be flipped if required, but which can also process the articles without flip, if necessary, without this option requiring reconfigurations of the system. Articles shall be handled at a reduced risk of damage, despite high throughput.

This object is achieved with a system as set forth in the claims below.

Yet another object of the invention is to provide a method for processing articles, which can be performed at high throughput. Articles shall be handled at a reduced risk of damage, despite high throughput.

This object is achieved with a method as set forth in the claims below.

The flipping apparatus according to the invention for flipping articles comprises a first flipping arm and a second flipping arm, which cooperate to achieve the desired flip of an article. Therein, the article can be provided to the flipping apparatus in any suitable way, for example, but not limited to, on a conveyor, on a tray, in a regular or irregular stream of articles, or by a robotic handler. The first flipping arm is configured to pick the provided article and to perform a rotation between a pick position and a pass position. The pick position and the pass position here denote two distinct orientations of the first flipping arm in space. The pick position is the orientation in space the first flipping arm has when picking an article. The pass position is the orientation in space the first flipping arm has when passing or handing over the picked article to the second flipping arm.

The second flipping arm is configured to perform a rotation between a receive position and a place position and to place the article. The receive position and the place position here denote two distinct orientations of the second flipping arm in space. The receive position is the orientation in space the second flipping arm has when receiving an article from the first flipping arm, i.e. when the first flipping arm, in the pass position, passes the article to the second flipping arm. The place position is the orientation in space the second flipping arm has when placing the received article at a destination location.

The first flipping arm moves between the pick position and the pass position by rotation through an angle, the second flipping arm moves between the receive position and the place position by rotation through an angle. These angles, in non-limiting embodiments, may be 90 degrees each.

According to the invention the first flipping arm is further configured to perform the rotation from the pick position to the pass position at a first speed, and the rotation in the reverse direction, from the pass position to the pick position, at a second speed, which is higher than the first speed. The second flipping arm, according to the invention, is further configured to perform the rotation from the receive position to the place position at a third speed, and the rotation from the place position to the receive position, i.e. in the reverse direction, at a fourth speed, which is higher than the third speed. Note that in ordinary operation, i.e. when the flipping apparatus is handling articles, the first flipping arm carries an article when moving from the pick position to the pass position, but does not carry an article when moving from the pass position to the pick position. Likewise, the second flipping arm carries an article when moving from the receive position to the place position, but does not carry an article when moving from the place position to the receive position.

Therefore it can be seen from the above that the speed of the first flipping arm or of the second flipping arm, respectively, is lower when carrying an article than when not carrying an article. In general, higher speeds, if attained within a defined time, imply higher accelerations, and therefore higher inertial forces on the articles carried by the flipping arms. By the above described inventive configuration of the flipping apparatus, high inertial forces on the articles are avoided, while the higher speeds of the flipping arms when not carrying articles nonetheless allow the flipping apparatus to operate at high throughput. Avoiding high inertial forces on the articles reduces the risk of damage to the articles.

In an embodiment the flipping apparatus is configured to control the first flipping arm to pick an article from a stream of articles, while the second flipping arm is performing the rotation from the receive position to the place position. In ordinary operation, the second flipping arm therein is carrying a further article, previously picked by the first flipping arm and passed to the second flipping arm. In this embodiment, the flipping apparatus can commence a flipping operation on an article, by bringing the first flipping arm into the pick position, while still completing the flipping operation on a previously picked article, with the second flipping arm. This configuration contributes to achieving high throughput of the flipping apparatus.

In a further embodiment, the flipping apparatus is configured to control the first flipping arm and the second flipping arm in such a way that the second flipping arm inserts an article into a stream of articles at a position relative to the stream of articles from which the first flipping arm has picked an article. In case of a serial stream of articles supplying the articles to the flipping apparatus consecutively, this means that by the flipping operation the articles are shifted back by one article position in the stream only, and the stream of articles, supplying the articles to the flipping apparatus as an input stream, can continue as an output stream of flipped articles, with the articles delayed by only one article position. In such a configuration the flipping apparatus will hardly be the limiting factor on throughput. A flipping apparatus configured to operate in this way is particularly suitable for integration in a system in which the articles are not always to be flipped. If articles are to be processed without flipping, the flipping apparatus can be left inactive, and the stream of articles just passes the flipping apparatus, without incurring the delay of one article position.

The first flipping arm and the second flipping arm can employ various techniques to pick, hold or carry an article. In an embodiment, the flipping arms are configured to hold articles by vacuum. This means that, in a known manner, the flipping arms are equipped with nozzles that contact the articles, and a pressure lower than the ambient pressure is generated within the nozzle, so that the article is pressed against the nozzle by the ambient pressure.

Depending on the precise arrangement of the flipping arms in the flipping apparatus and on details of design of the latter, the flipping arms, when performing their respective rotations may also perform, before, after, or simultaneously with the respective rotation, a sliding movement. This, for example, may be necessary to be able to align the first flipping arm, in the pass position, carrying an article, with the second flipping arm in the receive position, in order to pass the article from the first flipping arm to the second flipping arm without any collisions between the flipping arms or between the article and a flipping arm when the flipping arms move into or out of the pass position and receive position, respectively. Such a sliding movement thus is a detail of implementation of the basic functionality of the flipping apparatus described above.

Distinct from this potential sliding movement, in an embodiment of the flipping apparatus at least the first flipping arm or at least the second flipping arm is configured to perform a translation movement. Such a configuration can be employed if a location an article is to be picked from is spatially distant from a location at which the article is to be placed. The distance between these two locations can be covered by the translation movement. For example, the articles may be provided to the flipping apparatus on a tray or in an irregular arrangement, and the flipping apparatus, or at least the first flipping arm, may have to perform translations in order to pick the articles. Analogously, if the articles are to be placed on a tray or in an irregular arrangement, the flipping apparatus or at least the second flipping arm may have to perform translations in order to place the articles. A translation movement could also be employed to transfer articles from an input stream, for example on an input conveyor, to an output stream, for example on an output conveyor, at a distance from the input conveyor. In such a case, the translation movement achieves the transfer, and the flipping apparatus can optionally be operated to perform a flip of the article, so this is a further example of using a flipping apparatus according to an embodiment of the invention in a system in such a way that a reconfiguration of the system is not required if flips of articles are not performed. Generally speaking, the embodiment discussed here can be employed to pick an article with the first flipping arm from a first location and to place the article, in a flipped state, at a second location with the second flipping arm.

It has already been described that high inertial forces related with accelerations of articles during rotations of the first flipping arm or the second flipping arm imply a risk of damage to the articles. The same is true of inertial forces related with accelerations in translation movement. Therefore, in an embodiment of the flipping apparatus, the first flipping arm or the second flipping arm, respectively, or both, are configured to perform the respective translation movement at two different speeds. At a speed low enough so that the required accelerations leave the risk of damage to an article below an acceptable threshold, if the respective arm is carrying an article, and at a higher speed if the respective arm is not carrying an article.

A system according to the invention for processing articles comprises a transport means to provide at least one stream of articles through the system; and at least one flipping apparatus as described above. Several advantages of employing a flipping apparatus according to the invention in a system for processing articles have already been mentioned above. The transport means may for example, but not limited to, comprise one or plural conveyors, carrier wheels, or robotic handlers.

In a specific embodiment, the transport means is a rotating turret having defined carrier positions, each carrier position having a carrier configured to hold one article. Alternatively, at each carrier position a group of plural carriers may be provided, each carrier configured to hold one article.

In an embodiment, the system is configured to operate the transport means to transport a further article to the at least one flipping apparatus, while an article is being flipped by the flipping apparatus. It has already been stated above that the flipping apparatus according to the invention can commence a flipping operation of an article while still completing the flipping operation of another article. This embodiment of the system makes use of this capability of the flipping apparatus by providing a further article to the flipping apparatus still flipping another article. The configuration of this embodiment contributes to high throughput of the system.

In an embodiment of the system, operation of the at least one flipping apparatus is optional. For example, the transport means and the flipping apparatus may be arranged such that the transport means carries the articles past the flipping apparatus, and if the articles are to be flipped, the flipping apparatus flips the articles in place in the stream of articles or flips them as described above, with the flipped articles being displaced backwards relative to the stream of articles by one article position in the stream. Also already described above, an alternative example is that of the flipping apparatus configured to perform a translation movement between two distant conveyors carrying the articles.

In an embodiment of the system, the at least one stream of articles comprises an input stream and an output stream. The at least one flipping apparatus is configured to pick an article from the input stream with the first flipping arm in the pick position and to place the article, in a flipped state, into the output stream with the second flipping arm in the place position. As a specific feature of this embodiment, the input stream and the output stream are in a same plane perpendicular to a plane in which the first flipping arm performs the rotation from the pick position to the pass position and perpendicular to a plane in which the second flipping arm performs the rotation from the receive position to the place position. In particular, the same plane of the input stream and of the output stream may have a normal which is parallel to the direction of gravity.

In the method according to the invention an article is picked from a first location with a first flipping arm of a flipping apparatus, while the first flipping arm is in a pick position. Next, a rotation of the first flipping arm, which is now carrying the article, is performed from the pick position into a pass position at a first speed. After reaching the pass position, the first flipping arm passes the article to a second flipping arm. The second flipping arm therein is in a receive position. Next, the second flipping arm, now carrying the article, performs a rotation from the receive position into a place position at a third speed, and then places the article, in a flipped state, at a second location with the second flipping arm in the place position. In this method according to the invention, prior to picking the article, the first flipping arm has rotated into the pick position from the pass position at a second speed, which is higher than the first speed, and, likewise, prior to the passing of the article from the first flipping arm to the second flipping arm the second flipping arm has rotated into the receive position from the place position at a fourth speed, which is higher than the third speed.

This arrangement of the different speeds at which the flipping arms perform their respective rotations reduces the risk of damage to the article flipped, while at the same time allowing the method to be performed at high throughput. Pick position, pass position, receive position, and place position have already been defined above in the context of the flipping apparatus.

In an embodiment of the method, while the second flipping arm is carrying the article, a further article is provided to the flipping apparatus and the first flipping arm is rotating from the pass position to the pick position at the second speed to pick the further article. This manner of performing the method contributes to high throughput of the method.

In a specific embodiment of the method the second location is identical to the first location, i.e. the article is placed, in a flipped state, at the location from which it was picked before. Thus, in this embodiment, the article is flipped in place.

In a different embodiment, the articles are transported to the flipping apparatus in a stream of articles. The second flipping arm places an article at a location relative to the stream of articles after the first flipping arm has picked a further article from the same location. That is, by the flipping operation the articles are moved back one article position only in the stream of articles. In this embodiment, flipping of the further article obviously starts before the flipping of the article is complete, as the first flipping arm picks the further article before the second flipping arm places the article, previously picked by the first flipping arm and passed to the second flipping arm.

In a further embodiment at least the first flipping arm or at least the second flipping arm performs a translation movement in addition to the respective rotation. In a specific variant of this embodiment, both the first flipping arm and the second flipping arm perform a translation movement in addition to the respective rotation. These translation movements have already been discussed above in the context of the flipping apparatus. In a further specific variant of this embodiment, at least the first flipping arm or at least the second flipping arm, respectively, if not carrying an article, performs the translation movement at a higher speed than if carrying an article. As has been discussed above in the context of the flipping apparatus, this arrangement of the speeds contributes to reducing the risk of damage to the articles.

In an embodiment of the method, the second location, i.e. the location at which the article is placed by the second flipping arm, is at a distance from the first location, i.e. from the location from which the article is picked by the first flipping arm.

It is to be noted that the method according to the invention can be performed using the flipping apparatus according to the invention or the system according to the invention, respectively.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying schematic drawing figures, in which:

FIG. 7 illustrates one of various phases of the flipping method according to the invention for an article, schematically showing the flipping apparatus and a transport means for the articles;

FIG. 8 shows a comparison between a single-head and a multi-head configuration for a transport means;

FIG. 9 shows a specific embodiment of the method according to the invention as a timing table;

DETAILED DESCRIPTION OF THE INVENTION

Figure 1:
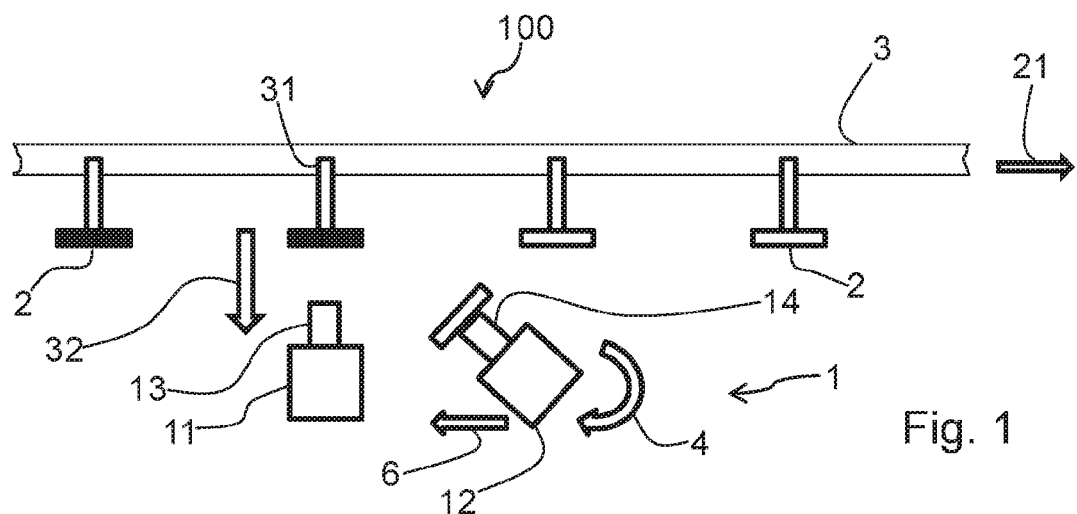
FIG. 1 illustrates one of various phases of the flipping method according to the invention for an article, schematically showing the flipping apparatus and a transport means for the articles.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIGS. 1 to 7 illustrate the stages of one exemplary flipping method according to the invention. The flipping apparatus 1, the articles 2, and further elements are shown only schematically therein. The articles 2 may for example be semiconductor devices, but this is not a limitation of the invention. The flipping apparatus 1 has a first flipping arm 11 and a second flipping arm 12. Articles 2 are provided to the flipping apparatus 1 by a transport means, which here is a turret wheel 3, of which only a part is shown. The turret wheel 3 and the flipping apparatus 1 form part of a system 100 for processing articles. For instance, the articles 2 could be inspected or worked on at locations of the system 100 not shown here, as this invention is concerned with the flipping of articles. Locations for inspecting or working the articles would be located upstream and/or downstream from the flipping apparatus 1, i.e. upstream and/or downstream from the portion shown in the Figures of the system 100. The turret wheel 3, or transport means in general, provides a stream of articles 2 through the system 100, in a direction 21. The transport means may move the articles in a continuous fashion, for example the turret wheel 3 may rotate at constant speed. Alternatively, the transport means may move the articles in a stepped manner, for example the turret wheel 3 may rotate through a given angle after pre-defined time-intervals. On the turret wheel 3, the articles are held by carriers 31 in defined positions.

FIG. 1 shows the first flipping arm 11 in the pick position. The first flipping arm 11 picks an article 2 to be flipped (indicated by a filled rectangle) by a relative movement between the article 2 and at least part of the first flipping arm 11. In the specific embodiment of the method according to the invention shown, the relative motion is generated by a motion of the carrier 31 holding the article 2 towards the first flipping arm 11 along a direction 32. When the article 2 contacts vacuum nozzle 13 of the first flipping arm 11, the carrier 31 releases the article 2 and the nozzle 13 holds the article 2, by vacuum. The carrier 31 then moves in the direction opposite to direction 32, away from the first flipping arm 11. Alternatively, the flipping arm 11, or only the nozzle 13 may move towards the article 2 held on the carrier 31, and return to their previous position after seizing the article 2 from the carrier 31.

While this is happening, second flipping arm 12, carrying an article 2 in a flipped state (indicated by an unfilled rectangle) on nozzle 14, is performing a rotation 4, and, in this embodiment, also a sliding motion 6. As has been discussed above, the sliding motion is a detail of the implementation. The second flipping arm 12 has received the article 2 at a previous stage of the process, and in FIG. 1, by rotation 4, is moving from the receive position into the place position. As has been mentioned above, this rotation 4 is at a speed lower than a rotation in the opposite direction, without article 2, in order to reduce the risk of damage to the article 2.

Figure 2:
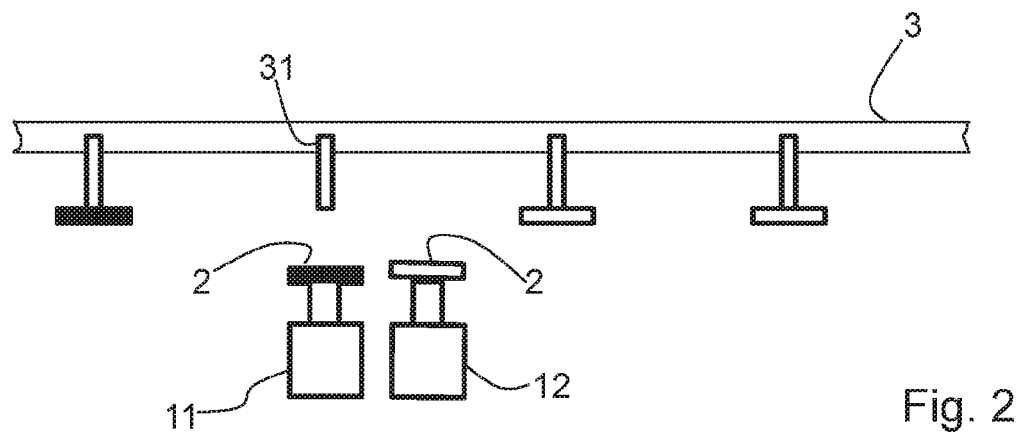
FIG. 2 illustrates one of various phases of the flipping method according to the invention for an article, schematically showing the flipping apparatus and a transport means for the articles.

FIG. 2 shows a stage of the flipping process where the second flipping arm 12 with article 2 has reached the place position, and the first flipping arm 11, still in the pick position, has picked article 2 from carrier 31, which now is empty.

Figure 3:
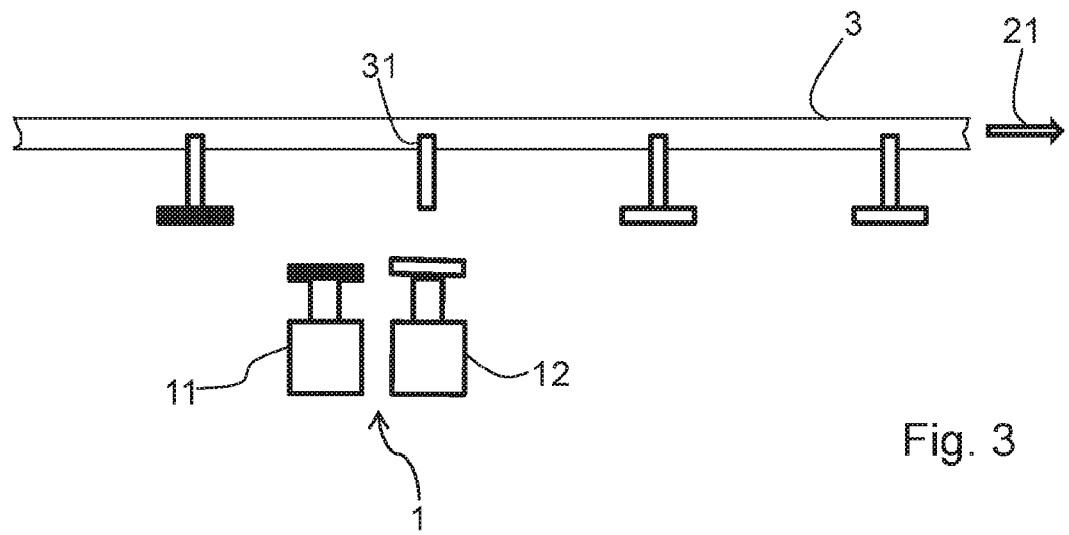
FIG. 3 illustrates one of various phases of the flipping method according to the invention for an article, schematically showing the flipping apparatus and a transport means for the articles.

FIG. 3 shows the stage where, by a relative movement between the turret wheel 3 and the flipping apparatus 1, the empty carrier 31 is aligned with the second flipping arm 12 in the place position. This alignment, in the embodiment shown, is achieved by a motion of the turret wheel 3 in direction 21. As an alternative, the alignment could be achieved by a motion of the flipping apparatus 1.

Figure 4:
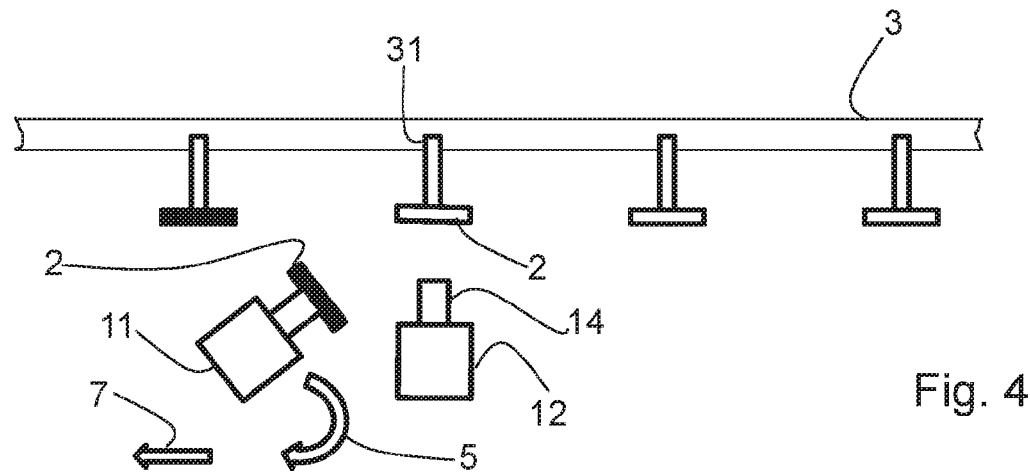
FIG. 4 illustrates one of various phases of the flipping method according to the invention for an article, schematically showing the flipping apparatus and a transport means for the articles.

FIG. 4 shows a subsequent stage, where the second flipping arm 12 has placed article 2, in a flipped state, on the carrier 31, from which the first flipping arm 11 picked an article 2 before. This placing of the article 2 on carrier 31 occurs by a relative motion between the carrier 31 and the second flipping arm 12 or at least a part of the second flipping arm, for example nozzle 14.

While this is happening, the first flipping arm 11, carrying an article 2, performs a rotation 5 from the pick position into the pass position, and is also performing a sliding motion 7. The sliding motion 7, as discussed above, is a detail of the implementation in the embodiment shown. As has been discussed above, the rotation 5 into the pass position occurs at a lower speed than the rotation in the reverse direction.

Figure 5:
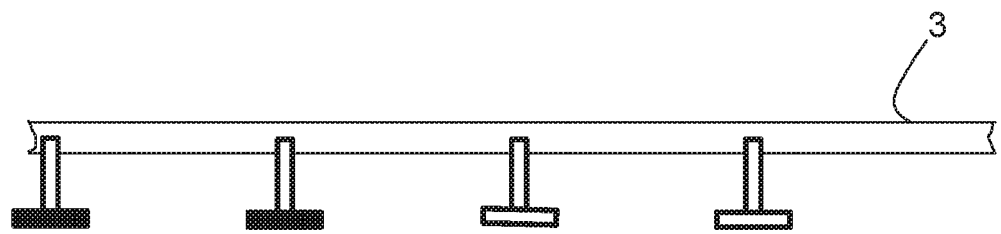
FIG. 5 illustrates one of various phases of the flipping method according to the invention for an article, schematically showing the flipping apparatus and a transport means for the articles.

FIG. 5 shows a stage where the first flipping arm 11 has reached the pass position. Between the stages shown in FIG. 4 and FIG. 5, the second flipping arm 12 has rotated into the receive position. This rotation, opposite in direction to the rotation 4 shown in FIG. 1, occurs without the second flipping arm 12 carrying an article, and is performed at a higher speed than the rotation 4, as without an article carried, there is no risk of damage to an article due to inertial forces.

Figure 6:
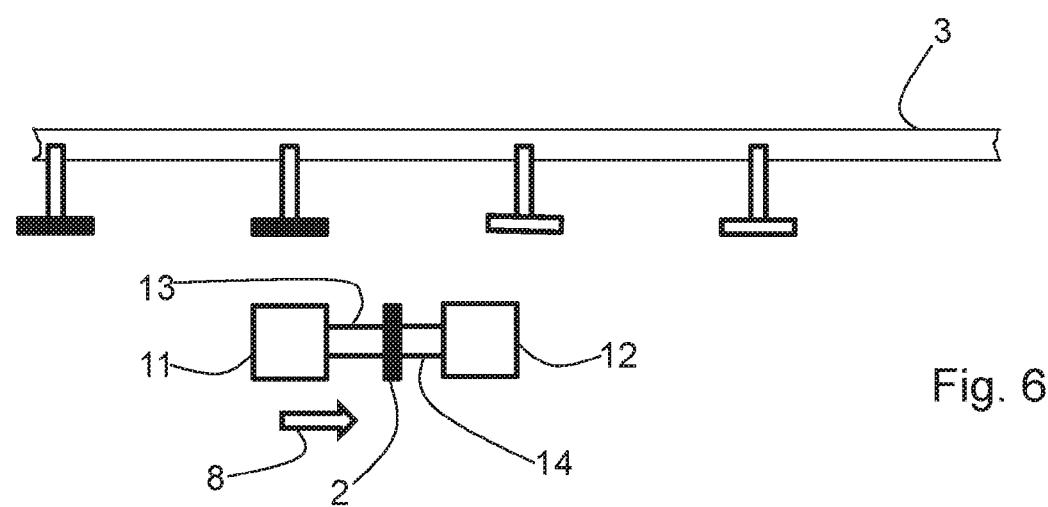
FIG. 6 illustrates one of various phases of the flipping method according to the invention for an article, schematically showing the flipping apparatus and a transport means for the articles.

FIG. 6 shows the transfer of the article 2 from the first flipping arm 11 to the second flipping arm 12, i.e. it shows the first flipping arm 11, in the pass position, passing the article 2 to the second flipping arm 12, in the receive position, which is receiving the article 2. In the embodiment shown, the transfer occurs by the nozzle 13 of the first flipping arm 11 extending along direction 8, until the article 2 makes contact with the nozzle 14 of the second flipping arm 12. Alternatively, the nozzle 14 of the second flipping arm 12 could move towards the article 2 still on the first flipping arm 11, or the first flipping arm 11 could move towards the second flipping arm 12, or the second flipping arm 12 could move towards the first flipping arm 11, or any combination thereof.

FIG. 7 shows a stage where the article 2, now in a flipped state, is carried by the second flipping arm 12. Next, the first flipping arm rotates from the pass position to the pick position, i.e. performs a rotation opposite to rotation 5 shown in FIG. 4. This rotation is performed at a higher speed than the rotation 5, as the first flipping arm 11 is not carrying an article and therefore there is no risk of damaging an article due to high inertial forces. The second flipping arm 12 starts a rotation from the receive position to the place position, and this takes the method back to the stage shown in FIG. 1.

An entire cycle of the method, i.e. the steps from FIG. 1 through FIG. 7, and back to FIG. 1, in a prototype of the system takes 180 milliseconds. This should make clear that inertial forces on the articles could indeed be very high, if this was not prevented by the choices of speeds for rotation, and in embodiments also for translation, according to the invention as discussed above.

FIG. 8 shows a part of a turret wheel 3, which is of a single-head configuration, as also appeared in the description of the stages of the method in FIGS. 1 to 7, and for comparison, a part of a turret wheel 33, which is of a multi-head configuration. In the single-head configuration of turret wheel 3, individual carriers 31 are arranged in single file along the turret wheel 3. Note that contrary to the views of FIGS. 1 to 7, in FIG. 8 the carriers 31 extend out of the plane of the drawing. In the multi-head configuration of turret wheel 33, groups 35 of carriers 31 are arranged along the turret wheel 33. In the example shown, each group 35 comprises five carriers 31.

A multi-head turret wheel 33 could also be used in the method according to the invention. The method could be performed, for instance, along the lines shown in FIGS. 1 to 7, where the flipping arms 11 and 12 operate to consecutively flip all the articles provided by one group 35 of carriers 31, before the turret wheel 33 moves the next carrier group 35 to the flipping apparatus 1. This embodiment would require the flipping arms 11 and 12 to perform additional translation movements, in order to reach the individual carriers 31 of each group 35 of carriers.

As an alternative, a flipping apparatus could be provided for each carrier 31 in a carrier group 35. For the example of transport means 33, this means that five flipping apparatuses are to be provided. The method could be performed in parallel and independently on the corresponding carriers 31 of each group 35 of carriers.

The multi-head concept is also applicable to transport means other than a turret wheel.

FIG. 9 shows a specific embodiment of the method according to the invention as a timing table. A total cycle of the method as shown takes 180 milliseconds (ms). The first column of the table describes the action taking place. The second column gives the total time required for the respective action. Columns 3 to 8 represent a time slice of 30 ms each (as indicated in the first row), and in rows below the first row, an entry of "30" indicates that in this time slice the action named in the first column for this row takes place, while no entry indicates that in this time slice the action named in the first column for this row does not take place.

It can be seen for example that in the first time slice (third column) the first flipping arm gets loaded with an article from a turret wheel, while the second flipping arm is completing a "slow swing up", here meaning the rotation from the receive position to the place position, accompanied by a sliding movement. The second flipping arm started this rotation in slice 6 of the previous cycle. In the second time slice, the first flipping arm and the second flipping arm perform a sliding movement, as discussed above.

In the third time slice, the second flipping arm places an article on the turret, here by the turret picking the article from the second flipping arm. Meanwhile, the first flipping arm starts a "slow swing down", which here corresponds to a rotation from the pick position to the pass position, accompanied by a sliding motion. In the fourth time slice, the turret starts a rotation that will last till the end of the cycle. The first flipping arm completes the "slow swing down" and at the end of the fourth time slice is in the pass position. The second flipping arm performs a "fast swing down", which here corresponds to a rotation from the place position into the receive position, also accompanied by a sliding movement.

In the fifth time slice, the second flipping arm performs a sliding movement to contact the article until now held by the first flipping arm, in order to effect a transfer of the article from the first flipping arm to the second flipping arm. In the sixth time slice, the first flipping arm performs a "fast swing up", which here means a rotation from the pass position to the pick position. The second flipping arm starts a "slow swing up", it will complete in the first time slice of the next cycle, accompanied by a sliding movement.

Figure 10:
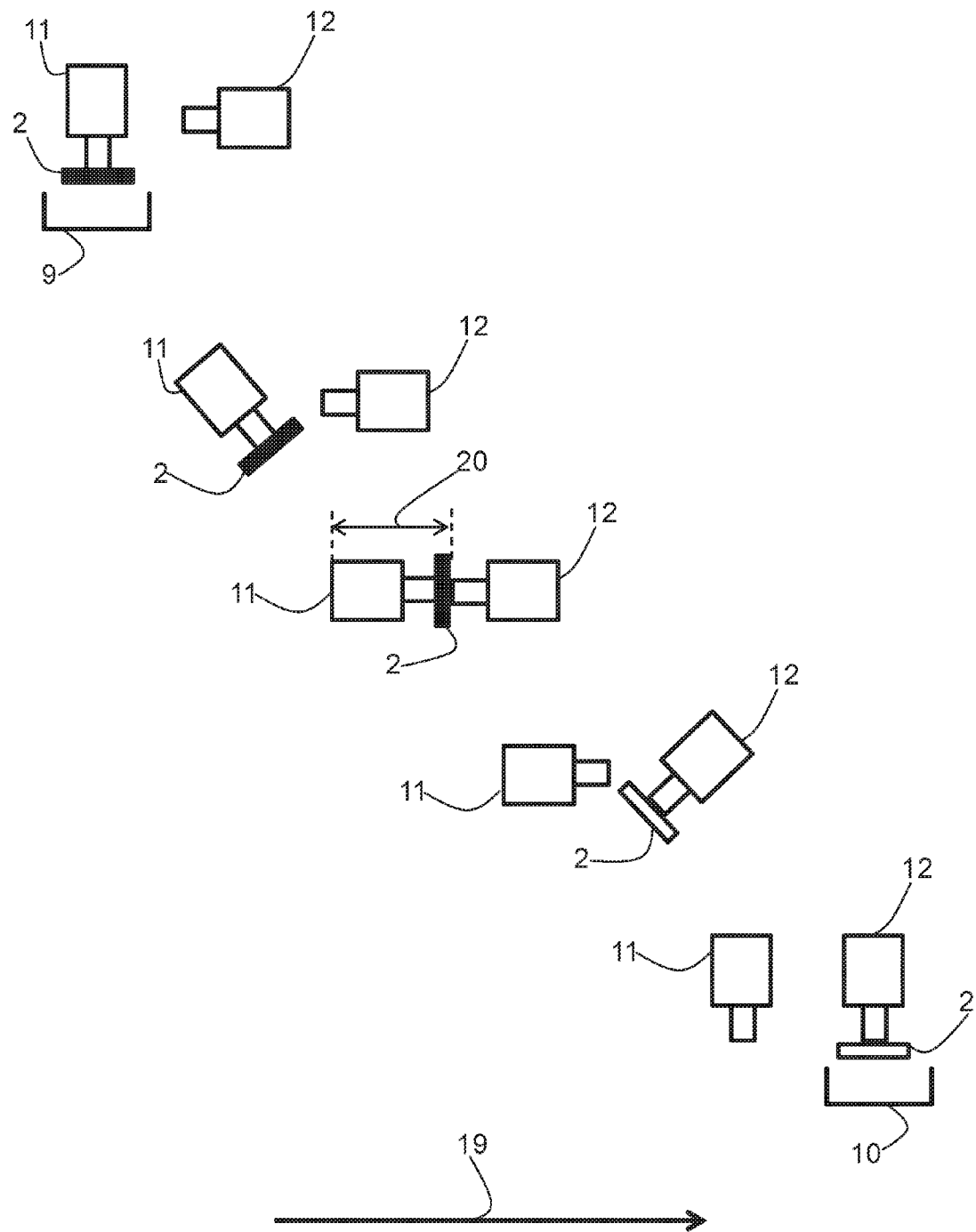
FIG. 10 illustrates an embodiment of the method according to the invention of flipping an article, where an additional translation of the flipping apparatus is involved; and, FIG. 11 shows an embodiment of a flipping apparatus according to the invention.

FIG. 10 illustrates an embodiment of the method for flipping articles involving an additional translation in a direction 19. From top to bottom five consecutive stages of the flipping of an article 2 are shown. In the first stage, the article 2, provided here for instance on an input tray 9, is picked by the first flipping arm 11. The first flipping arm 11 here is in the pick position. The second flipping arm 12, in the example shown, is already in the receive position. Instead of on an input tray 9, the article 2 could also be provided on an input conveyor, or by a robotic handler, on a carrier wheel, or in any other known suitable way. As soon as the article 2 has been picked by the first flipping arm 11, the translation motion of the first flipping arm 11 and the second flipping arm 12 along the direction 19 can start.

In the second stage, the first flipping arm, carrying the article 2, is performing a rotation from the pick position to the pass position, at a first speed, as discussed above. In the third stage, the first flipping arm 11 has reached the pass position, and the article 2 is transferred from the first flipping arm 11 to the second flipping arm 12. In the fourth stage, the article 2, in a flipped state, is carried by the second flipping arm 12. The second flipping arm 12 is performing a rotation from the receive position to the place position at a third speed, as discussed above. The first flipping arm 11 is shown still in the pass position, but can now perform a rotation from the pass position to the pick position at a second speed, higher than the first speed, as discussed above.

In the fifth stage, the first flipping arm 11 is shown in the pick position, the second flipping arm, still carrying the article 2, has reached the place position. The article 2, in the flipped state, can now be placed at a destination location, here an output tray 10. Instead of an output tray 10, also an output conveyor, a robotic handler, a carrier wheel, or any other suitable means of further transport could be used.

After placing the article 2, the first flipping arm 11 and the second flipping arm 12 can perform a translation in a direction opposite to the direction 19, in order to return to the initial position shown in the first stage, for picking a further article. During this translation, the second flipping arm 12 can perform a rotation from the place position to the receive position at a fourth speed, higher than the third speed, as discussed above.

It should be noted that the method discussed in the context of FIG. 10 allows for several modifications. For example, the first flipping arm 11 could start the translation movement back to the initial position of the first stage as soon as it has passed the article 2 to the second flipping arm 12, and only the second flipping arm 12 would continue to the destination location, here output tray 10. Also, the second flipping arm 12 need not move close to the input tray 9, but could be positioned somewhere between the input tray 9 and the output tray 10, waiting for the first flipping arm to bring the article 2 to the second flipping arm 12.

Yet further variants of this embodiment would be to have either the first flipping arm 11 remain at the input tray, and have only the second flipping arm 12 perform the translation along the direction 19 to place the article 2 and then return to the first flipping arm 11, or to have the second flipping arm 12 remain at the output tray 10, and have only the first flipping arm 11 perform the translation along the direction 19 to pass the article 2 and then return to the input tray 9.

Due to the additional translation movements in direction 19 and in the opposite direction, in this embodiment of the method there is generally more time for the flipping arms 11, 12 to perform their respective rotations than in the embodiments discussed in previous Figures. The speeds of the rotations performed by the flipping arms 11, 12 may therefore be reduced in comparison to embodiments where the flipping of the article 2 occurs without translation movements.

In the embodiment of FIG. 10, the first flipping arm 11 and/or the second flipping arm 12 can perform additional sliding movements, as has already been discussed above. These sliding movements are only to accommodate the flipping arms 11, 12 and article 2 during rotations, i.e. to avoid collisions between them, and to pass the article 2. Therefore, these sliding movements in general, not just in the embodiment of FIG. 10, are limited to distances not larger than twice a length 20 of a flipping arm with attached article 2, whereas translation movements, as the term is used in this application, such as the translations along direction 19 discussed in the context of FIG. 10, may cover larger distances.

Figure 11:
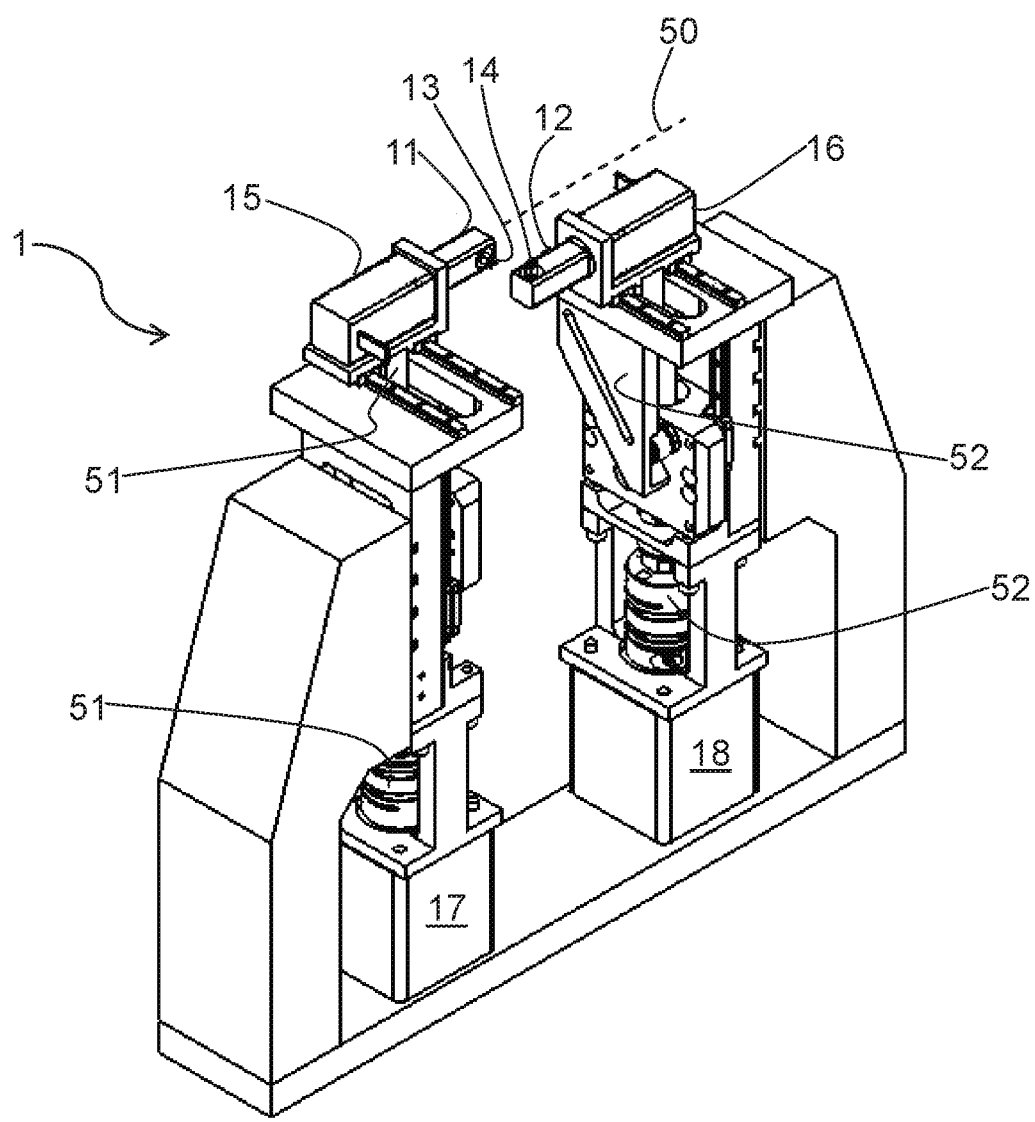

FIG. 11 shows a specific embodiment of a flipping apparatus 1 according to the invention. The specific design and configuration of the flipping apparatus 1 shown in FIG. 11 serve only as one example of a flipping apparatus according to the invention. It is not to be understood as a limitation of the invention.

The first flipping arm 11, exhibiting nozzle 13, is shown in the pass position. Rotation of the first flipping arm 11 from the pass position to the pick position and in the reverse direction is around axis 50, and is driven by flipping motor 15, on which the first flipping arm 11 is mounted. Via mechanical elements 51 a linear motor 17 drives a sliding motion of flipping motor 15, and thus of first flipping arm 11.

The second flipping arm 12, exhibiting nozzle 14, is shown in the place position. Rotation of the second flipping arm 12 from the place position to the receive position is around a, for reasons of clarity of the drawing, not shown, axis parallel to axis 50, and is driven by flipping motor 16, on which the second flipping arm 12 is mounted. Via mechanical elements 52 a linear motor 18 drives a sliding motion of flipping motor 16, and thus of the second flipping arm 12.

The invention has been described with reference to specific embodiments. It is obvious to a person skilled in the art, however, that alterations and modifications can be made without leaving the scope of the subsequent claims.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS 1 flipping apparatus
2 article
3 turret wheel
4 rotation
5 rotation
6 sliding movement
7 sliding movement
8 sliding movement
9 input tray
10 output tray
11 first flipping arm
12 second flipping arm 13 nozzle
14 nozzle
15 flipping motor first flipping arm
16 flipping motor second flipping arm
17 linear motor
18 linear motor
19 direction of translation
20 length
21 direction of stream of articles
31 carrier
32 direction of carrier movement
33 turret wheel
35 group of carriers
50 axis of rotation
51 mechanical elements
52 mechanical elements

What is claimed is:

1. A flipping apparatus for flipping articles comprising:
a first flipping arm configured to pick an article and to perform a rotation between a pick position and a pass position; and,
a second flipping arm configured to receive the article from the first flipping arm, to perform a rotation between a receive position and a place position and to place the article,
wherein
the pass position and the receive position are coextensive and the article is passed from the first flipping arm to the second flipping arm at the pass and receive positions;
the first flipping arm is further configured to perform the rotation from the pick position to the pass position at a first rotational speed, and the rotation from the pass position to the pick position at a second rotational speed, which is higher than the first rotational speed; and,
the second flipping arm is further configured to perform the rotation from the receive position to the place position at a third rotational speed, and the rotation from the place position to the receive position at a fourth rotational speed, which is higher than the third rotational speed.

2. The flipping apparatus of claim 1, configured to control the first flipping arm to pick an article from a stream of articles, while the second flipping arm is performing the rotation from the receive position to the place position.

3. The flipping apparatus of claim 1, configured to control the first flipping arm and the second flipping arm in such a way that the second flipping arm inserts an article into a stream of articles at a position relative to the stream of articles from which the first flipping arm has picked an article.

4. The flipping apparatus of claim 1, wherein the first flipping arm and the second flipping arm are configured to hold articles by vacuum.

5. The flipping apparatus of claim 1, wherein at least the first flipping arm or at least the second flipping arm is configured to perform a translation movement.

6. The flipping apparatus of claim 5, wherein the first flipping arm or the second flipping arm is configured to perform the translation movement at two different rotational speeds.

7. The flipping apparatus of claim 5, configured to pick an article with the first flipping arm from a first location and to place the article, in a flipped state, at a second location with the second flipping arm.

8. A system for processing articles, comprising:
a transport means to provide at least one stream of articles through the system; and
at least one flipping apparatus comprising:
a first flipping arm configured to pick an article and to perform a rotation between a pick position and a pass position; and,
a second flipping arm configured to receive the article from the first flipping arm, to perform a rotation between a receive position and a place position and to place the article,
wherein
the pass position and the receive position are coextensive and the article is passed from the first flipping arm to the second flipping arm at the pass and receive positions;
the first flipping arm is further configured to perform the rotation from the pick position to the pass position at a first rotational speed, and the rotation from the pass position to the pick position at a rotational second speed, which is higher than the first rotational speed; and,
the second flipping arm is further configured to perform the rotation from the receive position to the place position at a third rotational speed, and the rotation from the place position to the receive position at a fourth rotational speed, which is higher than the third rotational speed.

9. The system of claim 8, configured to operate the transport means to transport a further article to the at least one flipping apparatus, while an article is being flipped by the at least one flipping apparatus.

10. The system of claim 8, wherein the at least one stream of articles comprises an input stream and an output stream, wherein the at least one flipping apparatus is configured to pick an article from the input stream with the first flipping arm in the pick position and to place the article, in a flipped state, into the output stream with the second flipping arm in the place position, and wherein the input stream and the output stream are in a same plane perpendicular to a plane in which the first flipping arm performs the rotation from the pick position to the pass position and to a plane in which the second flipping arm performs the rotation from the receive position to the place position.

11. The system of claim 8, wherein the transport means is a rotating turret having carriers at defined positions, each carrier configured to hold one article.

12. The system of claim 8, wherein the transport means is a rotating turret having carrier groups at defined positions, each carrier group comprising a plurality of carriers, each carrier configured to hold one article.

13. A method for processing articles comprising the following steps:
picking an article from a first location with a first flipping arm of a flipping apparatus, while the first flipping arm is in a pick position;
performing a rotation of the first flipping arm, carrying the article, from the pick position into a pass position at a first rotational speed;
passing the article from the first flipping arm in the pass position to a second flipping arm of the flipping apparatus, with the second flipping arm in a receive position;
performing a rotation of the second flipping arm carrying the article from the receive position into a place position at a third rotational speed; and placing the article, in a flipped state, at a second location with the second flipping arm in the place position, wherein prior to picking the article the first flipping arm has rotated into the pick position from the pass position at a second rotational speed, which is higher than the first rotational speed, and wherein prior to the passing of the article from the first flipping arm to the second flipping arm the second flipping arm has rotated into the receive position from the place position at a fourth rotational speed, which is higher than the third rotational speed.

14. The method of claim 13, wherein, while the second flipping arm is carrying the article, a further article is provided to the flipping apparatus and the first flipping arm is rotating from the pass position to the pick position at the second rotational speed to pick the further article.

15. The method of claim 13, wherein the second location is identical to the first location.

16. The method of claim 14, wherein the articles are transported to the flipping apparatus in a stream of articles, and the second flipping arm places the article at a location relative to the stream of articles after the first flipping arm has picked the further article from the same location.

17. The method of claim 13, wherein at least the first flipping arm or at least the second flipping arm performs a translation movement in addition to the respective rotation.

18. The method of claim 17, wherein both the first flipping arm and the second flipping arm perform a translation movement in addition to the respective rotation.

19. The method of claim 17, wherein at least the first flipping arm or at least the second flipping arm, if not carrying an article, performs the translation movement at a higher speed than if carrying an article.

20. The method of claim 17, wherein the second location is at a distance from the first location.

* * * * *